(12) United States Patent
Luo et al.

(10) Patent No.: US 8,324,329 B2
(45) Date of Patent: Dec. 4, 2012

(54) PROCESS FOR PRODUCING FUNCTIONALIZED POLYMERS

(75) Inventors: Steven Luo, Copley, OH (US); Kevin M. McCauley, Coventry Township, OH (US); Timothy L. Tartamella, Silver Lake, OH (US); Mark W. Smale, Hudson, OH (US); Randhir Shetty, Carrboro, NC (US)

(73) Assignee: Bridgestone Corporation, Tokyo (JP)

( * ) Notice: Subject to any disclaimer, the term of this patent is extended or adjusted under 35 U.S.C. 154(b) by 453 days.

(21) Appl. No.: 11/890,590

(22) Filed: Aug. 7, 2007

(65) Prior Publication Data

US 2009/0043046 A1 Feb. 12, 2009

(51) Int. Cl.
*C08F 2/00* (2006.01)
*C08F 2/38* (2006.01)
*C08F 4/00* (2006.01)

(52) U.S. Cl. .............................. 526/78; 526/86; 526/89

(58) Field of Classification Search ............... 525/331.9, 525/117, 377, 383, 343, 105; 526/78, 86, 526/89
See application file for complete search history.

(56) References Cited

U.S. PATENT DOCUMENTS

| | | | |
|---|---|---|---|
| 3,742,057 A * | 6/1973 | Bunting et al. .............. | 564/512 |
| 3,886,127 A | 5/1975 | Furukawa et al. | |
| 3,998,998 A | 12/1976 | Uraneck et al. | |
| 4,105,839 A * | 8/1978 | Koyanagi et al. ............... | 526/62 |
| 4,223,116 A | 9/1980 | Moczygemba et al. | |
| 4,522,988 A | 6/1985 | Kang et al. | |
| 4,562,171 A | 12/1985 | Kang | |
| 4,562,172 A | 12/1985 | Kang et al. | |
| 4,906,706 A | 3/1990 | Hattori et al. | |
| 4,954,125 A | 9/1990 | Ono et al. | |
| 4,990,573 A | 2/1991 | Andreussi et al. | |
| 5,064,910 A | 11/1991 | Hattori et al. | |
| 5,567,784 A | 10/1996 | Weider et al. | |
| 5,844,050 A | 12/1998 | Fukahori et al. | |
| 6,451,934 B1 | 9/2002 | Jang et al. | |
| 6,479,601 B1 | 11/2002 | Kerns et al. | |
| 6,699,813 B2 | 3/2004 | Luo et al. | |
| 6,897,270 B2 | 5/2005 | Ozawa et al. | |
| 6,943,250 B2 * | 9/2005 | Brockmann ................. | 544/229 |
| 6,977,281 B1 | 12/2005 | Ozawa et al. | |
| 6,992,147 B1 | 1/2006 | Ozawa et al. | |
| 7,008,899 B2 | 3/2006 | Luo et al. | |
| 7,094,849 B2 | 8/2006 | Luo et al. | |
| 8,017,695 B2 | 9/2011 | Luo et al. | |
| 2004/0147694 A1 | 7/2004 | Sone et al. | |
| 2006/0004131 A1 * | 1/2006 | Ozawa et al. ................. | 524/342 |
| 2006/0025539 A1 | 2/2006 | Ozawa et al. | |
| 2006/0030677 A1 | 2/2006 | Ozawa et al. | |
| 2007/0149717 A1 | 6/2007 | Luo et al. | |
| 2007/0258942 A1 | 11/2007 | Stamler et al. | |
| 2007/0276122 A1 | 11/2007 | Luo et al. | |
| 2008/0051519 A1 | 2/2008 | Luo et al. | |
| 2008/0051552 A1 | 2/2008 | Luo et al. | |
| 2008/0154020 A1 | 6/2008 | Yan et al. | |
| 2008/0312315 A1 | 12/2008 | Daniloff et al. | |
| 2009/0099325 A1 | 4/2009 | Luo et al. | |
| 2009/0171035 A1 | 7/2009 | Luo et al. | |
| 2010/0004413 A1 | 1/2010 | Luo et al. | |
| 2010/0099826 A1 | 4/2010 | Ozawa et al. | |
| 2010/0168378 A1 | 7/2010 | Luo | |
| 2010/0280217 A1 | 11/2010 | Luo et al. | |
| 2011/0077325 A1 | 3/2011 | Luo | |
| 2011/0144282 A1 | 6/2011 | Luo | |
| 2011/0152449 A1 | 6/2011 | Luo et al. | |

FOREIGN PATENT DOCUMENTS

| | | | |
|---|---|---|---|
| EP | 0713885 | * | 8/1994 |
| EP | 0713885 | * | 5/1996 |
| EP | 0713885 A1 | | 5/1996 |
| EP | 1939221 A2 | | 7/2008 |
| JP | 05-051406 A | | 3/1993 |
| JP | 05-059103 A | | 3/1993 |
| JP | 6015598 B2 | | 3/1994 |
| JP | 10025313 A | | 1/1998 |
| JP | 10-306113 A | | 11/1998 |
| JP | 11-035633 A | | 2/1999 |
| RU | 2114128 C1 | | 6/1998 |

OTHER PUBLICATIONS

Not yet published, U.S. Appl. No. 60/875,484.
European Search Report for Application Serial No. EP 08 25 2620, Luo, et al.
Henry L. Hsieh, Gene H. C. Yeh, Ind. Eng. Chem. Prod. Dev. 1986, 25, pp. 456-463.
Office Action dated Nov. 26, 2010 for technology related U.S. Appl. No. 11/955,437; 18 pages.

* cited by examiner

*Primary Examiner* — Ling Choi
*Assistant Examiner* — Monique Peets
(74) *Attorney, Agent, or Firm* — Meredith E. Hooker; Arthur M. Reginelli

(57) ABSTRACT

A method for preparing a functionalized polymer, the method comprising the steps of (a) polymerizing monomer in the presence of a coordination catalyst to form a polymer, (b) inhibiting said step of polymerizing with a Lewis base, and (c) reacting the polymer with a functionalizing agent.

24 Claims, No Drawings

PROCESS FOR PRODUCING FUNCTIONALIZED POLYMERS

FIELD OF THE INVENTION

One or more embodiments of the present invention are directed toward a process for preparing functionalized polymers, the process including treating an active polymerization mixture with a Lewis base and reacting polymers contained therein with a functionalizing agent.

BACKGROUND OF THE INVENTION

Polymers may be prepared by solution polymerization, wherein monomer is polymerized in a solvent or diluent. Polymers may also be prepared by bulk polymerization (also called mass polymerization), wherein monomer is polymerized in the absence or substantial absence of any solvent, and, in effect, the monomer itself acts as a diluent.

Stereoregular polymers such as cis-1,4-polydienes can be produced by polymerizing monomers such as conjugated dienes in the presence of a coordination catalyst system. An example of a coordination catalyst system is a lanthanide-based catalyst system. Lanthanide-based catalyst systems that comprise a lanthanide compound, an alkylating agent, and a halogen source are known to be useful for producing conjugated diene polymers having high cis-1,4-linkage contents.

In certain situations, the polymer produced by a coordination catalyst system is reactive. As a result, it may be advantageous to further react the polymer with a functionalizing agent to yield a functionalized polymer with tailored properties. Once the functionalized polymer has been prepared, the polymerization mixture in which the polymer is contained may be quenched with a quenching agent in order to render the polymerization mixture non-reactive. For example, quenching the mixture can cease further polymerization of monomer as well as deactivate any residual reactive polymer, catalyst, and/or catalyst components. This quenching may take place by protonating the residual reactive polymer, catalyst, and/or catalyst components.

The ability to react a functionalizing agent with a polymer produced by a coordination catalyst system is often not trivial. The reactivity of the polymer can be impacted by a number of factors and is often unpredictable. Also, the rate of reaction between a functionalizing agent and a polymer produced by a coordination catalyst system can be very slow or may be impacted by competing reactions occurring within the polymerization mixture such as the polymerization of monomer.

The slow reaction rate and/or unpredictability of the reaction between a functionalizing agent and a reactive polymer presents several disadvantages. First, monomer conversion (and correspondingly molecular weight) cannot be easily controlled. This can be especially deleterious in bulk polymerization systems because temperature control can be very difficult and local hot spots may occur within the polymerization mixture which can result in polymer degradation, gelation, and/or discoloration. In the extreme case, uncontrolled acceleration of the polymerization rate can lead to disastrous "runaway" reactions. Similarly, uncontrolled monomer conversion can lead to polymer products of very high molecular weight that form gels. The undesirable build-up of insoluble gelled polymer can foul equipment, which reduces productivity and increases the cost of operation.

In order to avoid these problems in bulk polymerization systems, great care must be taken to properly time the introduction of the functionalizing agent to the polymerization mixture. And, the timing of the addition of a quenching agent to protonate and thereby deactivate the mixture must likewise be carefully timed. In some situations, the quenching agent must be introduced to the polymerization mixture before adequate time is allowed for the functionalizing agent to react with the polymer.

Because there are many advantages associated with functionalized polymers prepared with coordination catalyst systems, there is a need to improve upon the polymerization processes employed to make these functionalized polymers.

SUMMARY OF THE INVENTION

One or more embodiments of the present invention provide a method for preparing a functionalized polymer, the method comprising the steps of (a) polymerizing monomer in the presence of a coordination catalyst to form a polymer, (b) inhibiting said step of polymerizing with a Lewis base, and (c) reacting the polymer with a functionalizing agent.

One or more embodiments of the present invention also provide a method for preparing a functionalized polymer, the method comprising the steps of (a) introducing monomer and a coordination catalyst to a reactor to form a polymerization mixture, (b) polymerizing at least a portion of the monomer in the presence of the catalyst, (c) adding a Lewis base to the polymerization mixture after said step of polymerizing the monomer, and (d) adding a functionalizing agent to the polymerization mixture.

One or more embodiments of the present invention also provide a continuous polymerization method for preparing a functionalized polymer, the method comprising the steps of (a) continuously introducing a coordination catalyst and monomer to form a polymerization mixture, (b) allowing at least a portion of the monomer to polymerize into a reactive polymer within a first zone, (c) continuously removing the polymerization mixture from the first zone and transferring the mixture to a second zone, (d) continuously introducing a Lewis base to the polymerization mixture within the second zone, (e) continuously removing the polymerization mixture from the second zone and transferring the mixture to a third zone, and (f) continuously introducing a functionalizing agent to the polymerization mixture within the third zone.

One or more embodiments of the present invention also provide a functionalized polymer prepared by a method comprising the steps of (a) polymerizing monomer in the presence of a coordination catalyst to form a polymer, (b) inhibiting said step of polymerizing with a Lewis base, and (c) reacting the polymer with a functionalizing agent.

DETAILED DESCRIPTION OF ILLUSTRATIVE EMBODIMENTS

According to one or more embodiments of the present invention, an active polymerization mixture prepared with a coordination catalyst system is treated with a Lewis base, and the reactive polymer within the polymerization mixture is reacted with a functionalizing agent in the presence of the Lewis base. By introducing a Lewis base to an active polymerization mixture, several advantages can be realized. For example, in certain embodiments, the Lewis base can inhibit the polymerization without deleteriously impacting the ability of the reactive polymer to react with a functionalizing agent. Therefore, sufficient time can be allowed for the polymer to react with the functionalizing agent without losing control over the monomer conversion and polymer molecular weight. This is particularly advantageous where the rate of reaction between the reactive polymer and the functionalizing agent is slow. In those embodiments where the polymerization is conducted in a high solids or bulk polymerization system, treating the active polymerization mixture with a Lewis base offers additional advantages. For example, the risk of a runaway polymerization is greatly reduced because monomer conversion can be controlled during the course of reaction between the polymer and the functionalizing agent. And, the fouling of equipment is also greatly reduced because the polymer molecular weight can be controlled.

In one or more embodiments, an active polymerization mixture includes monomer, catalyst, propagating polymer (which may also be referred to as reactive polymer), and optionally solvent. In certain embodiments, the polymerization mixture may also optionally include non-propagating polymer and catalyst residue.

In one or more embodiments, monomers include those that can undergo coordination polymerizations, i.e., polymerizations brought about by coordination catalysts that operate by a mechanism involving the coordination of monomer to an active metal center. In particular embodiments, monomers include conjugated diene monomers optionally together with monomers copolymerizable with conjugated diene monomers. Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more of the foregoing diene monomers may be employed. Examples of monomer copolymerizable with conjugated dienes include vinyl-substituted aromatic monomer such as styrene, p-methylstyrene, α-methylstyrene, and vinylnaphthalene.

Propagating polymers include polymeric species that are capable of undergoing further polymerization through the addition of monomer. In one or more embodiments, propagating polymers may include an anion or negative charge at their active terminus. These polymers may include those initiated by a coordination catalyst. In these or other embodiments, the propagating polymeric species may be referred to as a pseudo-living polymer. Non-propagating polymers include polymeric species that cannot undergo further polymerization through the addition of monomer.

In one or more embodiments, catalysts include metal compounds that are capable of polymerizing monomer by a chain polymerization mechanism. These metal compounds may include one or more organometallic species or the reaction product thereof (i.e., catalyst residue) optionally together with co-catalyst components. Included are coordination catalysts, i.e., catalysts that initiate the polymerization of monomer by a mechanism involving the coordination or complexation of monomer to an active metal center prior to the insertion of monomer into a growing polymer chain. The key features of coordination catalysts have been discussed in many books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). An advantageous feature of coordination catalysts is their ability to provide stereochemical control of polymerizations and thereby produce stereoregular polymers. As is known in the art, there are numerous methods for generating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via pi-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Examples of coordination catalyst systems include nickel-based systems, cobalt-based systems, and lanthanide-based systems. Useful nickel-based catalyst systems are disclosed in U.S. Pat. Nos. 6,479,601, 6,451,934, 4,562,172, 4,562,171, and 4,223,116, which are incorporated herein by reference. Useful cobalt-based systems are disclosed in U.S. Pat. Nos. 6,479,601, 4,954,125, 4,562,172, 4,562,171, and 4,522,988, which are incorporated herein by reference. Useful lanthanide-based catalyst systems are disclosed in U.S. Pat. Nos. 6,897,270, 7,094,849, 6,992,147, and 7,008,899, which are incorporated herein by reference; as well as U.S. Ser. Nos. 60/875,484, 11/640,711, 11/710,713, and 11/710,845, which are incorporated herein by reference. In particular embodiments, a lanthanide-based catalyst system is employed for polymerizing conjugated diene monomers into cis-1,4-polydienes.

In one or more embodiments, the polymerization mixture may optionally include a solvent. Suitable solvents include those organic compounds that will not undergo polymerization or incorporation into the propagating polymer chain in the presence of catalyst. In one or more embodiments, these organic species are liquid at ambient temperature and pressure. In one or more embodiments, these organic solvents are inert to the catalyst composition. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The active polymerization mixture can be prepared by combining or introducing monomer, a catalyst that can initiate the polymerization of monomer under appropriate conditions, and optionally solvent.

In one or more embodiments, the amount of catalyst employed to initiate the polymerization may depend on several factors. For example, the amount may depend on the type of catalyst employed, the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalysts or catalyst ingredients may be used.

In one or more embodiments, where a lanthanide-, nickel- or cobalt-based coordination catalyst is employed, the amount of the lanthanide, nickel or cobalt compound used can be varied from about 0.001 to about 1 mmol, in other embodiments from about 0.005 to about 0.5 mmol, and in still other embodiments from about 0.01 to about 0.2 mmol per 100 gram of monomer.

In one or more embodiments, the polymerization system may be generally considered a solution polymerization system that includes a substantial amount of solvent. In these cases, the solvent content of the polymerization mixture may be more than 20% by weight, in other embodiments more than 50% by weight, and in still other embodiments more than 80% by weight based on the total weight of the polymerization mixture. Examples of suitable solvents have been set forth above.

In other embodiments, the polymerization system employed may be generally considered a bulk polymerization system that includes substantially no solvent or a minimal amount of solvent. In these cases, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. In other embodiments, those skilled in the art will appreciate the benefits of bulk polymerization processes (i.e., processes where monomer acts as the solvent), and therefore the polymerization mixture includes less solvent than will deleteriously impact the benefits sought by conducting bulk polymerization. In particular embodiments, the polymerization mixture is devoid of solvent.

Regardless of the type of polymerization system employed, in certain embodiments, a small quantity of an organic solvent, which can be either low-boiling or high-boiling, may be employed as a carrier to either dissolve or suspend the catalyst ingredients in order to facilitate the delivery of the catalyst ingredients to the polymerization system. In other embodiments, monomer can be used as the catalyst carrier. In yet another other embodiments, the catalyst ingredients can be used in their neat state without any solvent.

The polymerization mixture may be formed by employing any conventional techniques known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose.

In one or more embodiments, all of the ingredients used to prepare the polymerization mixture can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a portion thereof) may be conducted. For example, and as is known in the art, it may be advantageous to combine certain catalyst ingredients in the absence or presence of monomer and allow them to age before initiating polymerization. Techniques of this type are disclosed in U.S. Pat. Nos. 6,699,813, 6,897,270, and 7,094,849, which are incorporated herein by reference.

Once all of the ingredients are introduced, the polymerization of the monomer may be allowed to proceed. The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Once a desired monomer conversion is achieved, the polymerization mixture is treated with a Lewis base. In one or more embodiments, treatment of the mixture may be accomplished by introducing the Lewis base and polymerization mixture. This may occur by adding a Lewis base to the polymerization mixture. In one or more embodiments, the Lewis base can be introduced as a neat material to the polymerization mixture. In other embodiments, the Lewis base can be diluted with a solvent or monomer prior to being introduced to the polymerization mixture.

Lewis bases are commonly defined as substances (either neutral compounds or ions) that are capable of donating one or more electron pairs to other substances. On the other hand, the substances (either neutral compounds or ions) that are capable of accepting one or more electron pairs are called Lewis acids. Many types of Lewis bases can be employed to treat the polymerization mixture. In one or more embodiments, the Lewis base does not contain any protic hydrogen atoms. Protic hydrogen atoms include those hydrogen atoms that can be released as a proton under polymerization conditions.

Lewis bases can be classified according to the types of donor atoms that can be bonded to a Lewis acid. Typical donor atoms include nitrogen, oxygen, sulfur, phosphorus, arsenic, antimony, bismuth, selenium, tellurium, and halogen atoms. Lewis bases can also be classified according to their denticities. The denticity of a Lewis base refers to the number of donor atoms that can be bonded to a Lewis acid. Suitable Lewis bases can have various denticities, e.g., monodentate, bidentate, tridentate, quadridentate, or multidentate.

Example of monodentate Lewis bases include tetrahydrofuran, furan, N-methylpyrrole, N-methylimidazole, pyridine, thiophene, ethers, thioethers, amines, phosphines, phosphites, arsines, stibines, bismuthines, nitriles, isocyamides, cyanates, isocyanates, thiocyanates, and isothiocyanates.

Examples of bidentate Lewis bases include N,N,N',N'-tetramethylethylenediamine, 2,2-bis(2'-tetrahydrofuranyl)propane, 1,2-bis(piperidino)ethane, dipiperidinomethane, 2,2'-dipyridyl (also called 2,2'-bipyridine), 1,10-phenanthroline, 1,2-dimethoxyethane, bis(2-pyridyl)methane, β-diketones, bis(diphenylphosphino)methane, 1,2-bis(diphenylphosphino)ethane, 1,3-bis(diphenylphosphino)propane, 1,4-bis(diphenylphosphino)butane, cis-1,2-bis(diphenylphosphino)ethylene, 1,2-bis(diphenylphosphino)benzene, 1,1'-bis(diphenylphosphino)ferrocene, bis(dimethylphosphino)methane, 1,2-bis(dimethylphosphino)ethane, 1,3-bis(dimethylphosphino)propane, 1,4-bis(dimethylphosphino)butane, cis-1,2-bis(dimethylphosphino)ethylene, 1,2-bis(dimethylphosphino)benzene, 1,1'-bis(dimethylphosphino)ferrocene, and 1,2-bis(dimethylarsino)benzene.

Examples of tridentate Lewis bases include 2,2':6',2''-terpyridine, N,N,N',N'',N''-pentamethyldiethylenetriamine, tris(2-pyridyl)methane, bis(2-diphenylphosphinoethyl)phenylamine, bis(2-diphenylphosphinoethyl)phenylphosphine, tris(diphenylphosphino)methane, 1,1,1-tris(diphenylphosphinomethyl)ethane, and bis(3-dimethylarsinopropyl)methylarsine.

Examples of quadridentate Lewis bases include N,N,N',N'',N''',N'''-hexamethyltriethylenetetramine, tris(2-diphenylphosphinoethyl)phosphine, tris(2-diphenylphosphinoethyl)amine, tris(2-dimethylaminoethyl)amine, tris(2-diphenylphosphinophenyl)phosphine, tris(2-diphenylarsinophenyl)arsine, and tris(2-methylthioethyl)amine.

Examples of multidentate Lewis bases include macrocyclic nitrogen-based Lewis bases (e.g., porphine, porphyrins, and phthalocyanines), macrocyclic polyethers (also called crown ethers), macrocyclic polythioethers (also called crown thioethers), macrobicyclic or macropolycyclic Lewis bases containing mixed oxygen and nitrogen donor atoms (also called cryptates or cryptands), and ethylenediaminetetraacetate (also called EDTA).

The timing of the addition of the Lewis base to the polymerization mixture, the location within a process at which the Lewis base is introduced to the polymerization mixture, and the amount of Lewis base introduced to the polymerization mixture may vary depending on a number of factors. For example, the timing may vary depending on the solids content of the polymerization mixture, the processing equipment, and the process design being employed. The location may vary based upon process design including whether a continuous or batch process is being employed. The amount may vary depending upon the type of Lewis base employed, the type and amount of polymerization catalyst employed, and the degree of inhibition of the polymerization that is desired. In certain embodiments, it may be advantageous to bring a complete cessation to the polymerization of monomer. In other embodiments, it may be advantageous to substantially reduce or partially reduce the rate of polymerization.

In one or more embodiments, the Lewis base is added to the polymerization mixture after a monomer conversion of at least 5%, in other embodiments at least 10%, in other embodiments at least 20%, in other embodiments at least 50%, and in other embodiments at least 80%. In these or other embodiments, the Lewis base is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15% monomer conversion.

In one or more embodiments, the Lewis base may be added to the polymerization mixture at a location (e.g., within a vessel) where the polymerization of monomer (or at least a portion thereof) has taken place. In other embodiments, the Lewis base may be introduced to the polymerization mixture at a location that is distinct from where the polymerization of monomer (or at least a portion thereof) has taken place. For example, the Lewis base may be introduced to the polymerization mixture in downstream vessels including downstream reactors or tanks, in-line reactors or mixers, extruders, or devolatilizers.

In particular embodiments, the polymerization process is a continuous process where the introduction of the Lewis base occurs within a distinct zone of the process. For example, the polymerization of monomer (or at least a portion thereof) occurs within a zone of the process (e.g., a reactor), which zone may be referred to as a first zone. After a desired monomer conversion, the polymerization mixture is removed from the first zone and introduced to a subsequent zone (e.g., a downstream reactor), which may be referred to as a second zone, where the Lewis base can be introduced to the polymerization mixture. In particular embodiments, especially where bulk polymerization is conducted, the polymerization mixture is removed from the first zone prior to complete monomer conversion (e.g., prior to 50% conversion), and the Lewis base is added to the polymerization mixture in the second zone to thereby inhibit or cease further monomer conversion.

In one or more embodiments, where a lanthanide-, nickel- or cobalt-based coordination catalyst is employed, the amount of Lewis base introduced to the polymerization mixture may vary from about 0.05 to about 100 moles, in other embodiments from about 0.1 to about 50 moles, and in other embodiments from about 0.2 to about 10 moles per mole of the lanthanide, nickel, or cobalt compound.

In one or more embodiments, the introduction of the Lewis base to the polymerization mixture impacts the polymerization of monomer. In one or more embodiments, the Lewis base inhibits the polymerization of monomer, which refers to a reduction in the rate at which the monomer is polymerized. In particular embodiments, the Lewis base substantially reduces the rate at which the monomer is polymerized, which refers to an appreciable reduction in the rate of polymerization. In other embodiments, the Lewis base completely ceases the polymerization of monomer.

In one or more embodiments, a functionalizing agent is introduced to the polymerization mixture, and the reactive polymer within the mixture is reacted with the functionalizing agent in the presence of the Lewis base.

The selection of a functionalizing agent may depend upon the catalyst system employed and/or the nature of the reactive polymer chains. In one or more embodiments, functionalizing agents include those compounds or reagents that can react with a reactive polymer and thereby provide the polymer with a reactive group that is distinct from a propagating chain that has not been reacted with the functionalizing agent. The reactive group may be reactive or interactive with other polymer chains (propagating and/or non-propagating) or with other constituents that may be combined with the polymer such as reinforcing fillers (e.g., carbon black). In one or more embodiments, the reaction between the functionalizing agent and the reactive polymer proceeds via an addition or substitution reaction.

In one or more embodiments, functionalizing agents include coupling agents that serve to combine two or more reactive polymer chains in a single macromolecule. In other embodiments, functionalizing agents include compounds that will add or impart a heteroatom to the polymer chain. In particular embodiments, functionalizing agents include those compounds that will impart a group to the polymer chain that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, especially where a lanthanide-based coordination catalyst system is employed to produce a pseudo-living polymer, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131 A1, 2006/0025539 A1, 2006/0030677 A1, and 2004/0147694 A1, which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference. Still others are disclosed in U.S. Pat. Nos. 4,906,706, 4,990,573, 5,064,910, 5,567,784, and 5,844,050, 6,992,147, 6977,281; U.S. Publication No. 2006/0004131A1; Japanese Patent Application Nos. 05-051406A, 05-059103A, 10-306113A, and 11-035633A, which are incorporated herein by reference.

Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The functionalizing agent may be introduced to the polymerization mixture after a desired monomer conversion but before the addition of a quenching agent containing a protic hydrogen atom. In one embodiment, the functionalizing agent may be added to the polymerization mixture once a peak polymerization temperature is observed. In other embodiments, the functionalizing agent may be added within about 25 to 35 minutes after the peak polymerization temperature is reached. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15% monomer conversion.

In particular embodiments, a functionalizing agent may be introduced to the polymerization mixture immediately prior to the introduction of a Lewis base. It may be desirable, however, to not add the functionalizing agent too far in advance of the Lewis base such that the timing of the addition of the functionalizing agent will have a deleterious impact on the ability of the Lewis base to inhibit the polymerization of the monomer. In particular embodiments, the functionalizing agent is introduced together with the Lewis base. In yet other embodiments, the functionalizing agent is added to the polymerization mixture after the introduction of the Lewis base to the polymerization mixture.

In one or more embodiments, the functionalizing agent may be added to the polymerization mixture at a location (e.g., within a vessel)where the Lewis base is added. In other embodiments, the functionalizing agent may be introduced to the polymerization mixture at a location that is distinct from where the Lewis base is added. For example, the functionalizing agent may be introduced to the polymerization mixture in downstream vessels including downstream reactors or tanks, in-line reactors or mixers, extruders, or devolatilizers.

In particular embodiments, the polymerization process is a continuous process where the introduction of the functionalizing agent occurs within a distinct zone of the process. For example, the polymerization of monomer (or at least a portion thereof) may occur in a first zone, the introduction of the Lewis base may occur in a subsequent zone (a second zone), and the introduction of the functionalizing agent may occur within a yet another subsequent zone, which may be referred to as a third zone. In particular embodiments, the introduction of the functionalizing agent occurs within a zone substantially downstream from the addition of the Lewis base.

The amount of functionalizing agent introduced to the polymerization mixture may depend upon various factors including the type and amount of catalyst used to initiate the polymerization, the type of functionalizing agent, the desired level of functionality and many other factors.

In one or more embodiments, where a lanthanide-based catalyst is employed, the amount of functionalizing agent may be in a range of from about 1 to about 200 moles, in other embodiments from about 5 to about 150 moles, and in other embodiments from about 10 to about 100 moles per mole of the lanthanide compound.

Once a functionalizing agent has been introduced to the polymerization mixture and a desired reaction time has been provided, a quenching agent may be optionally added to the polymerization mixture in order to deactivate any residual reactive polymer, catalyst, and/or catalyst components. In one or more embodiments, quenching agents include protic compounds, such as, but not limited to, alcohols, carboxylic acids, inorganic acids, or a mixture thereof. In particular embodiments, the quenching agent includes a polyhydroxy compound. Polyhydroxy compounds and methods for their use as quenching agents are disclosed in co-pending U.S. Ser. No. 11/890,591, which is filed contemporaneously herewith, is entitled Polyhydroxy Compounds as Polymerization Quenching Agents, and is incorporated herein by reference.

In one or more embodiments, polyhydroxy compounds include those compounds containing two or more hydroxy groups (i.e., OH) per molecule. In one or more embodiments, the polyhydroxy compounds may be characterized by an equivalent molecular weight of less than 100 g/mole, in other embodiments less than 80 g/mole, in other embodiments less than 60 g/mole, and in other embodiments less than 40 g/mole, where the equivalent molecular weight is defined as being equal to the molecular weight of a polyhydroxy compound divided by the number of hydroxy groups per molecule.

In one or more embodiments, the polyhydroxy compounds may be characterized by a boiling point that is in excess of 180° C., in other embodiments in excess of 200° C., in other embodiments in excess of 220° C., in other embodiments in excess of 240° C., and in other embodiments in excess of 260° C. at ambient atmospheric pressure.

Types of polyhydroxy compounds include di-hydroxy compounds, tri-hydroxy compounds, tetra-hydroxy compounds, and multi-hydroxy compounds. Polyhydroxy compounds may include aliphatic polyhydroxy compounds, cycloaliphatic polyhydroxy compounds, and aromatic polyhydroxy compounds.

The amount of the quenching agent introduced to the polymerization mixture may vary based upon several factors including the type and amount of catalyst used to initiate the polymerization as well as the type of quenching agent.

In one or more embodiments, the quenching agent may be added to the polymerization mixture at a location (e.g., within a vessel) where the functionalizing agent is added. In other embodiments, the quenching agent may be introduced to the polymerization mixture at a location that is distinct from where the functionalizing agent is added. For example, the quenching agent may be introduced to the polymerization mixture in downstream vessels including downstream reactors or tanks, in-line reactors or mixers, extruders, or devolatilizers.

In particular embodiments, the polymerization process is a continuous process where the introduction of the quenching agent occurs within a distinct zone of the process. For example, after introduction of the functionalizing agent, which occurs within a particular zone of the process (e.g., a third zone), the polymerization mixture is removed from that zone and introduced to a subsequent zone, which may be referred to as a fourth zone, where the quenching agent is introduced to the polymerization mixture. In particular embodiments, the introduction of the quenching agent occurs within a zone sufficiently downstream from the zone where the functionalizing agent is introduced so as to provide sufficient time for the functionalizing agent to react with the reactive polymer.

In one or more embodiments, an antioxidant may be added along with, before, or after the introduction of the quenching agent to the polymerization mixture. Useful antioxidants include those known in the art such as 2,6-di-tert-butyl-4-methylphenol. In one or more embodiments, the amount of the antioxidant employed may be from about 0.2% to about 1% by weight of the polymer product. The antioxidant can be added as a neat material or, if necessary, dissolved in a solvent or monomer prior to being added to the polymerization mixture.

Once the polymerization mixture has been quenched, the various constituents of the polymerization mixture may be recovered. In one or more embodiments, unreacted monomer can be recovered from the polymerization mixture. For example, monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may also be recovered from the polymerization mixture by using techniques known in the art. In one or more embodiments, desolventization and drying techniques may be used. For instance, especially where bulk polymerizations are conducted, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

The polymer product prepared according to this invention may be employed in preparing tire components. These tire components can be prepared by using the polymer product of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly (ethylene-co-propylene), poly (styrene-co-butadiene), poly (styrene-co-isoprene), and poly (styrene-co-isoprene-co-butadiene), poly (isoprene-co-butadiene), poly (ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like.

In one or more embodiments, the vulcanizable rubber composition may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In other embodiments, the polymer product of this invention may be employed in the manufacture of hoses, belts, shoe soles, seals in general including window seals, vibration damping rubber, and other industrial and consumer products.

In order to demonstrate the practice of the present invention, the following examples have been prepared and tested. The examples should not, however, be viewed as limiting the scope of the invention. The claims will serve to define the invention.

EXAMPLES

Example 1

In this example, 1,3-butadiene was polymerized into cis-1,4-polybutadiene by a batch and essentially bulk polymerization process. The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket with cold water running through. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of 1,3-butadiene monomer to the reactor, heating the reactor to 150° F., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 90° F., 29.1 mL of 0.68 M triisobutylaluminum (TIBA) in hexane was charged into the reactor followed by the addition of 4.7 mL of 0.053 M neodymium (III) versatate ($NdV_3$) in hexane. After the mixture inside the reactor was allowed to age for 5 minutes, the polymerization was started by charging 5.0 mL of 0.074 M ethylaluminum dichloride (EADC) in hexane into the reactor. After 15 minutes from the start of the polymerization, the polymerization mixture was quenched by diluting with 1360 g of hexane containing 4.6 mL of isopropanol and then dropping the batch to 3 gallons of isopropanol containing 5 g of 2,6-di-tert-butyl-4-methylphenol. The coagulated polymer was drum-dried. The yield of the polymer was 159.1 g (12.2% conversion). The Mooney viscosity ($ML_{1+4}$) of the polymer was determined to be 21.5 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 102,000 g/mole, a weight average molecular weight ($M_w$) of 291,000 g/mole, and a molecular weight distribution ($M_w/M_n$) of 2.9. The infrared spectroscopic analysis of the polymer indicated a cis-1,4-linkage content of 98.9%, a trans-1,4-linkage content of 0.8%, and a 1,2-linkage content of 0.3%.

Example 2

The polymerization experiment described in Example 1 was repeated except that after 15 minutes from the start of the polymerization, 2.6 mL of 0.10 M N,N,N',N'-tetramethylethylenediamine (TMEDA) in hexane was charged into the reactor to treat the polymerization mixture. After 5 minutes from the addition of TMEDA, 2.6 mL of 0.050 M di-n-octyltin bis(2-ethylhexylmaleate) (also called DOTBOM) in hexane was added to the reactor. After 5 minutes, the polymerization mixture was quenched by diluting with 1360 g of hexane containing 4.6 mL of isopropanol and then dropping the batch to 3 gallons of isopropanol containing 5 g of 2,6-di-tert-butyl-4-methylphenol. The coagulated polymer was drum-dried. The yield of the polymer was 165.1 g (12.7% conversion). The resulting polymer had the following properties: $ML_{1+4}$=35.0, $M_n$=115,000 g/mole, $M_w$=329,000 g/mole, $M_w/M_n$=2.9, cis-1,4-linkage=98.8%, trans-1,4-linkage=0.9%, and 1,2-linkage=0.3%.

Example 3

The polymerization experiment described in Example 1 was repeated except that after 14 minutes from the start of the polymerization, the polymerization mixture was quenched.

The yield of the polymer was 155.0 g (11.9% conversion). The resulting polymer had the following properties: $ML_{1+4}=23.8$, $M_n=108,000$ g/mole, $M_w=301,000$ g/mole, $M_w/M_n=2.8$, cis-1,4-linkage=98.9%, trans-1,4-linkage content=0.8%, and 1,2-linkage=0.3%.

Example 4

The polymerization experiment described in Example 3 was repeated except that after 14 minutes from the start of the polymerization, 1.24 mL of 0.20 M 2,2-bis(2'-tetrahydrofuranyl)propane in hexane was charged into the reactor to treat the polymerization mixture. After 20 seconds from the addition of 2,2-bis(2'-tetrahydrofuranyl)propane, 1.12 mL of 0.11 M di-n-octyltin bis(2-ethylhexylmaleate) (also called DOTBOM) in hexane was added to the reactor. After 5 minutes, the polymerization mixture was quenched by diluting with 1360 g of hexane containing 4.6 mL of isopropanol and then dropping the batch to 3 gallons of isopropanol containing 5 g of 2,6-di-tert-butyl-4-methylphenol. The coagulated polymer was drum-dried. The yield of the polymer was 143.5 g (11.0% conversion). The resulting polymer had the following properties: $ML_{1+4}=42.2$, $M_n=116,000$ g/mole, $M_w=338,000$ g/mole, $M_w/M_n=2.9$, cis-1,4-linkage=98.9%, trans-1,4-linkage=0.8%, and 1,2-linkage=0.3%.

A comparison of the results obtained in Example 1 with those obtained in Example 2 and a comparison of the results obtained in Example 3 with those obtained in Example 4 indicate that the addition of a Lewis base (e.g., TMEDA or 2,2-bis(2'-tetrahydrofuranyl)propane) to the polymerization mixture inhibits the polymerization without deleteriously impacting the ability of the reactive polymer to react with the coupling agent (DOTBOM), and therefore, sufficient time can be allowed for the polymer to react with DOTBOM without losing control over the monomer conversion.

Example 5

In this example, 1,3-butadiene was polymerized into cis-1,4-polybutadiene by a continuous and essentially bulk polymerization process. Neat 1,3-butadiene, 0.0335 M $NdV_3$ in hexane and 0.68 M TIBA were continuously fed to a catalyst aging vessel wherein the three components were in contact with each other for a period of 10 minutes. The catalyst aging vessel included a coiled tube having an inner diameter of about 1.1 cm and a length of about 122 m which was sufficiently long so as to provide the desired residence time and whose inside tube diameter was such that a turbulent velocity profile of the flow components was achieved. The aged mixture of 1,3-butadiene, TIBA, and $NdV_3$ entered a continuous polymerization reactor where it was mixed with a continuous stream of 0.070 M EADC in hexane. The reactor was equipped with a mechanical agitator capable of mixing high viscosity polymer cement and with a reflux condenser that was used to control the rate of 1,3-butadiene vaporization/condensation and hence control the cement temperature within the reactor. Specifically, by controlling the flow of chilled water to the condenser, the rate of 1,3-butadiene vaporization/condensation was maintained to allow for the isothermal operation of the reactor. The above-mentioned mixture of 1,3-butadiene and catalyst spent an average residence time of 18 minutes at 29° C. in the reactor, during which time the 1,3-butadiene was polymerized to a conversion of about 10%. The resulting polymer cement was continuously withdrawn from the reactor via a progressive cavity pump wherein a stream of 0.010 M N,N,N',N'-tetramethylethylenediamine (TMEDA) in hexane, which was used as a polymerization inhibitor according to the present invention, was introduced and mixed into the cement. The progressive cavity pump was also responsible for controlling the liquid level in the polymerization reactor. After passing the progressive cavity pump, the cement was fed to an inline mixer wherein a stream of 0.010 M DOTBOM in hexane, which was used as a coupling agent, was introduced and mixed into the cement. The cement was then transferred to another agitated reactor that provided suitable residence time for the reaction between the reactive polymer and the coupling agent. The cement was subsequently quenched with a stream of ethylene glycol in order to deactivate any remaining reactive polymer and the catalyst. The cement was further stabilized by the addition of an antioxidant stream consisting of a mixture of Irganox™ 1076 and Irganox™ 1520 dissolved in 1,3-butadiene. The final cement mixture was sent to a devolatilizer for removal of the unreacted monomer from the polymer. The resulting polymer was extruded from the devolatilizer by using an extruder and was further dried in an oven. The polymer had the following properties: $ML_{1+4}=50.6$, $M_n=88,300$ g/mole, $M_w=344,500$ g/mole, $M_w/M_n=3.9$, cis-1,4-linkage=99.1%, trans-1,4-linkage=0.6%, and 1,2-linkage=0.3%.

In conducting the above experiment, a 1,3-butadiene feed rate of 0.97 lb/min was used to achieve the desired reactor residence time. The feed rates of the catalyst components were maintained at levels to achieve a $NdV_3$ loading of 0.0156 mmol per 100 g of 1,3-butadiene and a Nd/TIBA/EADC molar ratio of 1:80:1.25. TMEDA was fed at a rate to achieve a TMEDA/Nd molar ratio of 1:1. DOTBOM was fed at a rate to achieve a DOTBOM/Nd molar ratio of 0.5:1. Ethylene glycol was added at a rate to completely deactivate TIBA and EADC. Since one hydroxy group will react with one aluminum-alkyl bond, about 1.5 moles of ethylene glycol is needed for deactivating one mole of TIBA, and about half mole of ethylene glycol is needed for deactivating one mole of EADC. Irganox™ 1076 and Irganox™ 1520 were added at levels of 0.3 and 0.08 parts by weight per 100 parts by weight of the polymer product, respectively.

During the above experiment, two TMEDA feed points were tested: one at the center of the progressive cavity pump and the other at the discharge point of the pump. It was found that the level of fouling occurring near the discharge point of the pump increased when the TMEDA feed point was moved downstream from the center of the pump to the discharge point of the pump. Moving the TMEDA feed point back to the center of the pump was found to drastically decrease the level of fouling occurring near the discharge point of the pump. It was also noticed that with the choice of either of the two TMEDA feed points as described above, the downstream equipment, such as the inline mixer and the coupling reactor, was found to be advantageously free from any fouling.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising the steps of:
   (a) polymerizing monomer in the presence of a coordination catalyst to form a reactive polymer having an active terminus;
   (b) after said step of polymerizing, inhibiting said step of polymerizing with a Lewis base; and
   (c) reacting the reactive polymer at its active terminus with a functionalizing agent.

2. The method of claim 1, where said step of inhibiting substantially reduces the rate at which the monomer is polymerized while maintaining the ability of the active terminus to react with the functionalizing agent.

3. The method of claim 1, where said step of inhibiting ceases the polymerization of monomer.

4. A method for preparing a functionalized polymer, the method comprising the steps of:
(a) introducing monomer and a coordination catalyst to a reactor to form a polymerization mixture;
(b) polymerizing at least a portion of the monomer in the presence of the catalyst;
(c) adding a Lewis base to the polymerization mixture after said step of polymerizing the monomer; and
(d) adding a functionalizing agent to the polymerization mixture.

5. The method of claim 4, where the solvent content of the polymerization mixture is less than about 20% by weight.

6. The method of claim 4, where said step of polymerizing the monomer provides a propagating polymer.

7. The method of claim 6, where the functionalizing agent reacts with the propagating polymer.

8. The method of claim 4, where said step of adding a Lewis base reduces the rate at which the monomer is polymerized.

9. The method of claim 4, where said step of adding a Lewis base substantially reduces the rate at which the monomer is polymerized.

10. The method of claim 4, where said step of adding a Lewis base ceases the polymerization of monomer.

11. The method of claim 4, where the coordination catalyst includes a lanthanide-based catalyst.

12. The method of claim 4, where said step of adding a Lewis base occurs after a monomer conversion of at least 10% but prior to a monomer conversion of 90%.

13. The method of claim 4, where said step of adding a Lewis base occurs after a monomer conversion of at least 10% but prior to a monomer conversion of 50%.

14. The method of claim 4, where said step of adding a functionalizing agent to the polymerization mixture occurs after said step of adding a Lewis base.

15. The method of claim 4, where said step of adding a functionalizing agent to the polymerization mixture occurs immediately prior to or together with said step of adding a Lewis base.

16. The method of claim 4, where the Lewis base contains no protic hydrogen atoms.

17. The method of claim 16, where the Lewis base is a monodentate Lewis base selected from the group consisting of tetrahydrofuran, furan, N-methylpyrrole, N-methylimidazole, pyridine, thiophene, ethers, thioethers, amines, phosphines, phosphites, arsines, stibines, bismuthines, nitriles, isocyanides, cyanates, isocyanates, thiocyanates, and isothiocyanates.

18. The method of claim 16, where the Lewis base is a bidentate Lewis base selected from the group consisting of N,N,N',N'-tetramethylethylenediamine, 2,2-bis(2'-tetrahydrofuranyl)propane, 1,2-bis(piperidino)ethane, dipiperidinomethane, 2,2'-dipyridyl (also called 2,2'-bipyridine), 1,10-phenanthroline, 1,2-dimethoxyethane, bis(2-pyridyl)methane, β-diketones, bis(diphenylphosphino)methane, 1,2-bis(diphenylphosphino)ethane, 1,3-bis(diphenylphosphino)propane, 1,4-bis(diphenylphosphino)butane, cis-1,2-bis(diphenylphosphino)ethylene, 1,2-bis(diphenylphosphino)benzene, 1,1'-bis(diphenylphosphino)ferrocene, bis(dimethylphosphino)methane, 1,2-bis(dimethylphosphino)ethane, 1,3-bis(dimethylphosphino)propane, 1,4-bis(dimethylphosphino)butane, cis-1,2-bis(dimethylphosphino)ethylene, 1,2-bis(dimethylphosphino)benzene, 1,1'-bis(dimethylphosphino)ferrocene, and 1,2-bis(dimethylarsino)benzene.

19. The method of claim 16, where the Lewis base is a tridentate Lewis base selected from the group consisting of 2,2':6',2"-terpyridine, N,N,N',N",N"-pentamethyldiethylenetriamine, tris(2-pyridyl)methane, bis(2-diphenylphosphinoethyl)phenylamine, bis(2-diphenylphosphinoethyl)phenylphosphine, tris(diphenylphosphino)methane, 1,1,1-tris(diphenylphosphinomethyl)ethane, and bis(3-dimethylarsinopropyl)methylarsine.

20. The method of claim 16, where the Lewis base is a quadridentate Lewis base selected from the group consisting of N,N,N',N",N"',N"'-hexamethyltriethylenetetramine, tris(2-diphenylphosphinoethyl)phosphine, tris(2-diphenylphosphinoethyl)amine, tris(2-dimethylaminoethyl)amine, tris(2-diphenylphosphinophenyl)phosphine, tris(2-diphenylarsinophenyl)arsine, and tris(2-methylthioethyl)amine.

21. The method of claim 16, where the Lewis base is a multidentate Lewis base selected from the group consisting of macrocyclic nitrogen-based Lewis bases, macrocyclic polyethers, macrocyclic polythioethers, macrobicyclic or macropolycyclic Lewis bases containing mixed oxygen and nitrogen donor atoms, and ethylenediaminetetraacetate.

22. The method of claims 2, where said step of polymerizing takes place within a polymerization mixture that includes less than 20% by weight solvent based upon the total weight of the polymerization mixture.

23. The method of claim 22, where said step of polymerizing results in conversion of the monomer to the polymer, and where said step of inhibiting takes place after a conversion of at least 5% but prior to a conversion of 20%.

24. The method of claim 4, further comprising the step of adding a quenching agent after said step of adding a functionalizing agent.

* * * * *